(12) United States Patent
Jang et al.

(10) Patent No.: US 9,618,727 B2
(45) Date of Patent: Apr. 11, 2017

(54) IMAGING LENS ASSEMBLY

(71) Applicants: Issac Jang, Shenzhen (CN); Jay Park, Shenzhen (CN)

(72) Inventors: Issac Jang, Shenzhen (CN); Jay Park, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 88 days.

(21) Appl. No.: 14/832,479

(22) Filed: Aug. 21, 2015

(65) Prior Publication Data

US 2016/0161708 A1 Jun. 9, 2016

(30) Foreign Application Priority Data

Dec. 5, 2014 (KR) .................. 10-2014-0174423

(51) Int. Cl.
*G02B 3/02* (2006.01)
*G02B 13/18* (2006.01)
*G02B 13/00* (2006.01)

(52) U.S. Cl.
CPC ................... *G02B 13/004* (2013.01)

(58) Field of Classification Search
CPC .... G02B 13/0045; G02B 13/004; G02B 9/34; G02B 9/10; G02B 5/005; G02B 15/173; G02B 15/177; H04N 5/2257
USPC ................................................. 359/642–830
See application file for complete search history.

(56) References Cited

U.S. PATENT DOCUMENTS

2014/0092491 A1* 4/2014 Hsu ..................... G02B 9/62
359/761

* cited by examiner

*Primary Examiner* — Mahidere Sahle
(74) *Attorney, Agent, or Firm* — Na Xu; IPro, PLLC

(57) ABSTRACT

An imaging lens assembly is disclosed in the present disclosure. The imaging lens assembly includes, in order from an object side to an image side: a stop; a first lens having a positive refractive power, a convex object-side surface and a convex image-side surface; a second lens having a negative refractive power and a convex and meniscus shaped image-side surface; a third lens having a positive refractive power, a convex object-side surface and a convex image-side surface; a fourth lens having a negative refractive power, an image-side surface being concave at a paraxial region and being convex and meniscus shaped at a peripheral region, and an object side-surface being convex at the paraxial region; the image-side surface of the fourth lens having an inflection point; at least one of the image-side surfaces of three lenses being spherical; and the imaging lens assembly satisfying following condition:

$$2.4 < \frac{R6}{R7} < 2.6.$$

7 Claims, 4 Drawing Sheets

IMAGING LENS ASSEMBLY

FIELD OF THE INVENTION

The present invention relates to an imaging lens assembly, and more particularly to an imaging lens assembly which is suitable for installation into an image input device of a portable telephone or personal computer, a digital camera, a CCD camera used for monitoring purposes, a surveying device, or similar.

DESCRIPTION OF RELATED ART

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been mounted in compact information terminals such as cellular phone sets.

With increases in the miniaturization and pixel density of solid-state image sensing devices, demands have arisen for smaller and higher-performance imaging lenses assembly to be mounted in these imaging apparatuses. The imaging lens assembly in the related art includes four lenses with aspheric surfaces. However, it is difficult for manufacturing such lens, and thus the production efficiency is low.

Accordingly, an improved imaging lens assembly which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to several embodiments.

Figure 1:
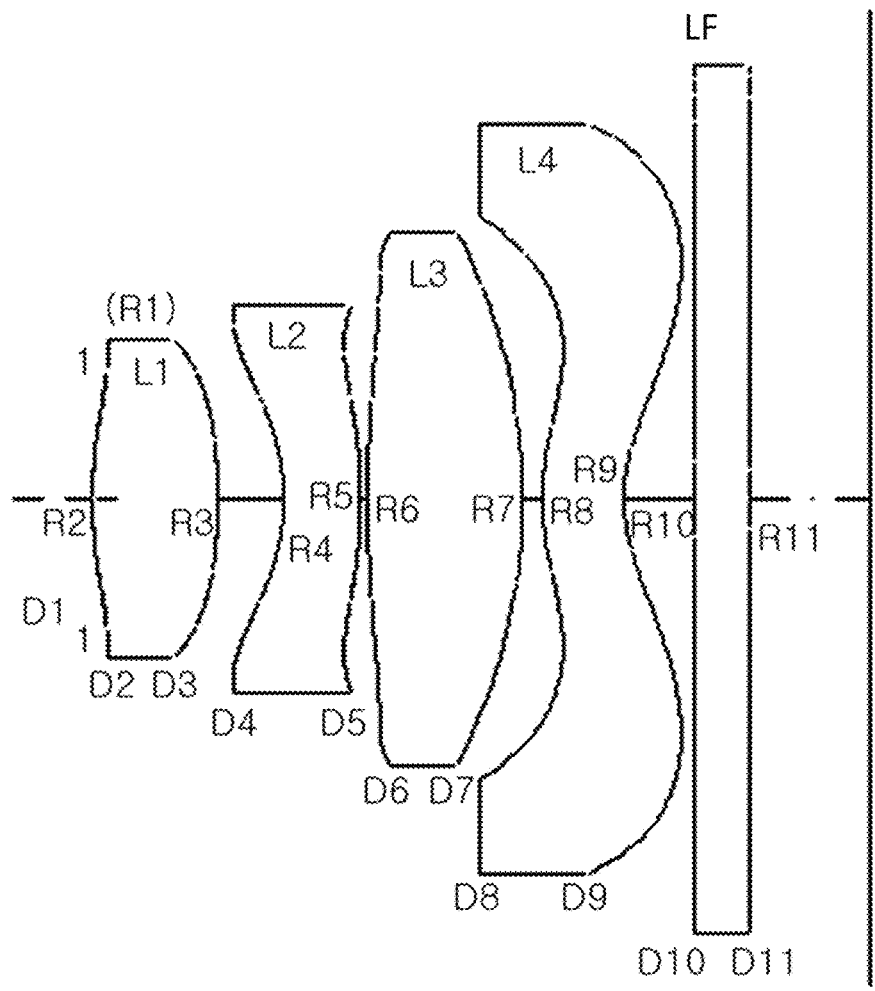
FIG. 1 is an illustrative structure of an imaging lens assembly related to a first embodiment of the present disclosure.
Figure 2:
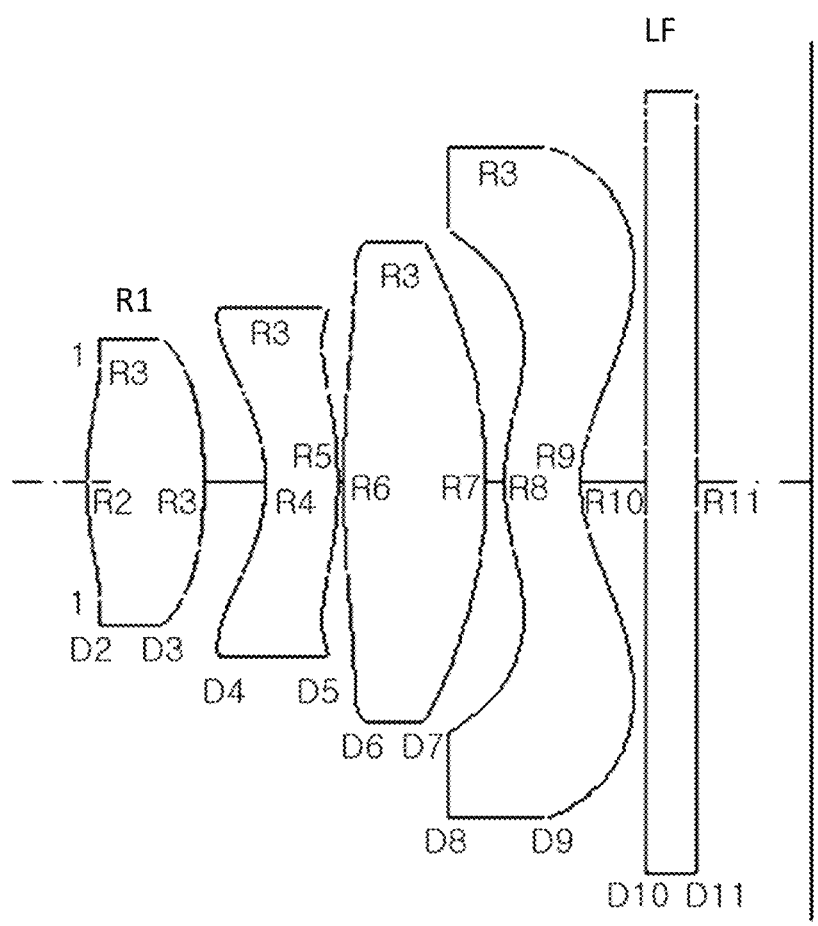
FIG. 2 is an illustrative structure of an imaging lens assembly related to a second embodiment of the present disclosure.

In FIG. 1 and FIG. 2, Ri (i=1, 2, 3, 4 . . . ) represents a curvature radius of a surface of a stop, lenses or a filter. Di (i=1, 2, 3, 4 . . . ) represents an axial thickness of a stop, lenses, a filter, or a distance between the lens and the filter.

Referring to FIG. 1 and FIG. 2, an imaging lens assembly comprises, in order from an object side to an image side, a stop St, a first lens L1, a second lens L2, a third lens L3 and a fourth lens L4. The imaging lens assembly further comprises an optical means disposed between the fourth lens L4 and image plane Si, such as a filter LF.

The first lens L1 has a positive refractive power, a convex object-side surface and a convex image-side surface.

The second lens L2 has a negative refractive power, a convex and meniscus shaped image-side surface.

The third lens L3 has a positive refractive power, a convex object-side surface and a convex image-side surface. In such case, the image-side surface of the third lens L3 is spherical. With such construction, the third lens L3 can be produced with lower machining precision and the error can be corrected. When R6 is a curvature radius of the object-side surface of the third lens, R7 is a curvature radius of the image-side surface of the third lens, they satisfies the following condition:

$$2.4 < \frac{R6}{R7} < 2.6 \tag{1}$$

The image-side surface of the third lens L3 is spherical, which can improve the optical performance of the imaging lens assembly. When the value does not satisfy the condition (1), the spherical aberration, astigmatism, astigmatic field and distortion would be increased. In such case, it would be difficult for correcting the aberration and deteriorate the performance of the imaging lens assembly.

The fourth lens L4 has a negative refractive power. An image-side surface of the fourth lens L4 may have an inflection point. The image-side surface of the fourth lens is concave at a paraxial region and is convex and meniscus shaped at a peripheral region. With such construction of the fourth lens, it can decrease the incident angle of the light incident on the image plane effectively and facilitate the correction of the spherical aberration and the astigmatic field, which can improve the performance of the imaging lens assembly.

Optionally, there is an inflection point formed on the object-side surface of the fourth lens L4. The object-side surface of the fourth lens L4 is convex at a paraxial region and is concave and meniscus shaped at a peripheral region. The object-side surface of the third lens is spherical, which can correct the spherical aberration, astigmatic field and distortion.

In the embodiment, the first lens L1 has a convex object-side surface and a convex image-side surface, which can be produced easily. The second lens L2 has a negative refractive power, which can shorten the total track length of the imaging lens assembly.

Figure 5:
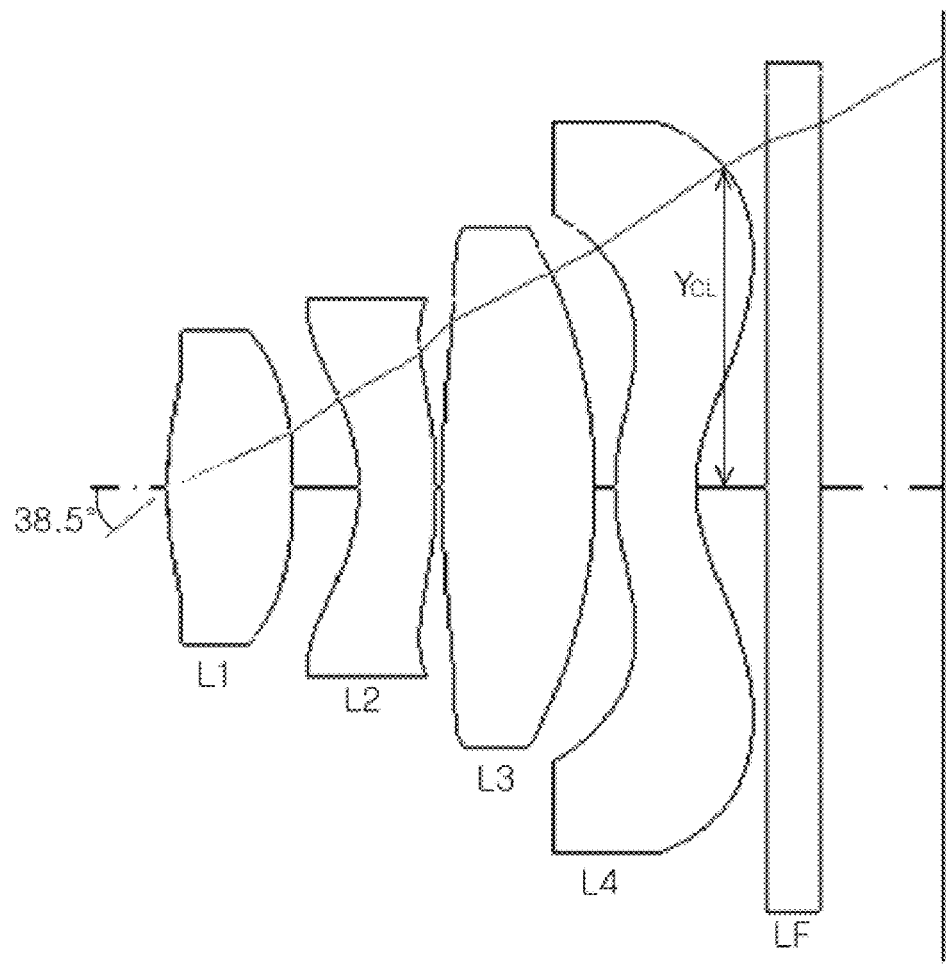
FIG. 5 shows the illustrative structure of the imaging lens assembly shown in FIG. 1, on which Yc1 is labeled.

As shown in FIG. 5, when the incident angle of the light is 38.5° and the light passes through the center of the stop, the vertical distance from the optical axis to the intersection point of the light and the image-side surface of the fourth lens is Yc1; a maximum image height of the imaging lens assembly is y, they satisfies the following condition:

$$0.65 < \frac{Yc1}{y} < 0.75 \tag{2}$$

If the value exceeds the maximum limit, it would broaden the depth of field (DOF), which causes an increased aberration and deteriorated performance. If the value exceeds the minimum limit, it would shorten the DOF. In such case, the wide-angle lens assembly cannot be produced.

when a distance between the object-side surface of the first lens and the image plane is TTL; y is a maximum image height of the imaging lens assembly, they satisfies the following conditions:

$$0.80 < \frac{TTL}{2y} < 0.95 \qquad (3)$$

If the value exceeds the maximum limit of condition (3), the total track length of the imaging lens assembly would be increased, thus, the imaging lens assembly cannot be minimized. If the value exceeds the minimum limit of condition (3), the refractive power of the imaging lens assembly would become too higher to correct the distortion by the second and third lenses.

The stop St may be disposed in the object side of the imaging lens assembly such that the total track length of the imaging lens assembly can be reduced and the outer diameter of the imaging lens assembly also can be reduced for minimizing the product.

The Abbe number of the first lens may be 50 or more. The Abbe number of the second lens may be ranged from 20 to 30. With such construction, it would correct the aberration increasing with rising focal length. When the difference between the Abbe number of the first lens and that of the second lens exceeds 20, the facula that can reduce the contrast would be eliminated. In such case, the Abbe number of the second lens L2 may be ranged from 23 to 24.

The third lens and fourth lens may be made of a material of which the Abbe number is 50 or more, which can correct the chromatic aberration.

Optionally, the first, third and fourth lenses may be made of a first plastic material for reducing the weight of the imaging lens assembly. The second lenses may be made of a second plastic material that is different from the first plastic material.

In the embodiment, the equation of the aspheric surface profiles of the aforementioned lens assembly is expressed as follows:

$$z = \frac{CR^2}{1 + \sqrt{1 - (a1+1)C^2 R^2}} + a4R^4 + a6R^6 + a8R^8 + a10R^{10} + a12R^{12} \ldots$$

$$R = \sqrt{X^2 + Y^2}, \quad C = \frac{1}{\text{radius}}$$

Wherein, Z is a distance between a top point of the lens assembly and the optical axis; R is a distance between a top point of the lens and an axis perpendicular to the optical axis; C is a reciprocal of the curvature radius of the top point of the lens assembly; a1 is a conic coefficient; a4, a6, a8, a10 and a12 are aspherical coefficient.

Table 1 shows the detailed optical data of Embodiment 1 shown in FIG. 1 and the aspheric surface data are shown in Table 2 below.

TABLE 1

Embodiment 1
f = 2.0813 mm, Fno = 2.2, DOF = 42.7872°

| Surface number | Surface shape | Curvature radius | thickness | refraction index | Abbe number |
|---|---|---|---|---|---|
| object side | sphere | infinity | infinity | | |
| stop | sphere | infinity | 0.00000 | | |
| 2 | asphere | 1.49984 | 0.47430 | 1.5441 | 56.1000 |
| 3 | asphere | −2.05440 | 0.24946 | | |
| 4 | asphere | −0.73028 | 0.29026 | 1.6355 | 23.9000 |
| 5 | asphere | −1.67352 | 0.02550 | | |
| 6 | asphere | 4.82937 | 0.58607 | 1.5441 | 56.1000 |
| 7 | sphere | −2.07395 | 0.07425 | | |
| 8 | asphere | 0.81848 | 0.30822 | 1.5348 | 56.0000 |
| 9 | asphere | 0.56726 | 0.26755 | | |
| 10 | sphere | infinity | 0.21000 | 1.5167 | 64.2000 |
| 11 | sphere | infinity | 0.44504 | | |
| image plane | sphere | infinity | 0.00496 | | |

TABLE 2

| aspherical coefficient | | | | | | | |
|---|---|---|---|---|---|---|---|
| K | a4 (A) | a6 (B) | a8 (C) | a10 (D) | a12 (E) | a14 (F) | a16 (G) |
| −2.2014E+00 | −1.4327E−01 | −7.2254E−01 | 1.0823E−01 | −6.5564E+00 | 2.9553E+00 | −1.0629E+01 | |
| 7.2259E+00 | −4.6481E−01 | −2.4853E−01 | −9.8550E−03 | 3.1638E+00 | −5.8623E+00 | −4.3206E+00 | |
| −8.1916E−01 | −7.6999E−02 | 1.9976E+00 | 1.8065E−01 | −2.6634E+00 | −2.4705E+00 | 5.8108E+00 | 4.1438E−01 |
| 1.7331E+00 | −7.6507E−04 | 1.5621E+00 | −6.6775E−01 | −9.8709E−01 | 1.0462E+00 | 7.9310E−01 | −1.2191E+00 |
| −3.7870E+01 | 6.6249E−02 | −2.7573E−01 | 3.1737E−01 | −7.1246E−02 | −1.8231E−01 | −8.0438E−02 | 2.5673E−01 |
| −4.6444E+00 | −6.8425E−01 | −1.2554E−01 | 7.7125E−01 | −5.252E−01 | −5.1830E−02 | 1.2751E−01 | −4.3361E−02 |
| −2.6070E+00 | −6.4902E−01 | 6.2183E−01 | −3.7024E−01 | 8.6801E−02 | 1.0271E−02 | −6.8577E−03 | −3.2433E−04 |

In Table 1, the curvature radius, the thickness and the focal length are shown in millimeters (mm) Surface numbers 2-11 represent the surfaces sequentially arranged from the object-side to the image-side along the optical axis. In Table 2, K represents the conic coefficient of the equation of the aspheric surface profiles; a4-a16 represents the aspheric coefficients ranging from the 4th order to 16th order. This information related to Table 1 and Table 2 applies also the Tables for the remaining embodiments, and so an explanation in this regard will not be provided again.

Figure 3:
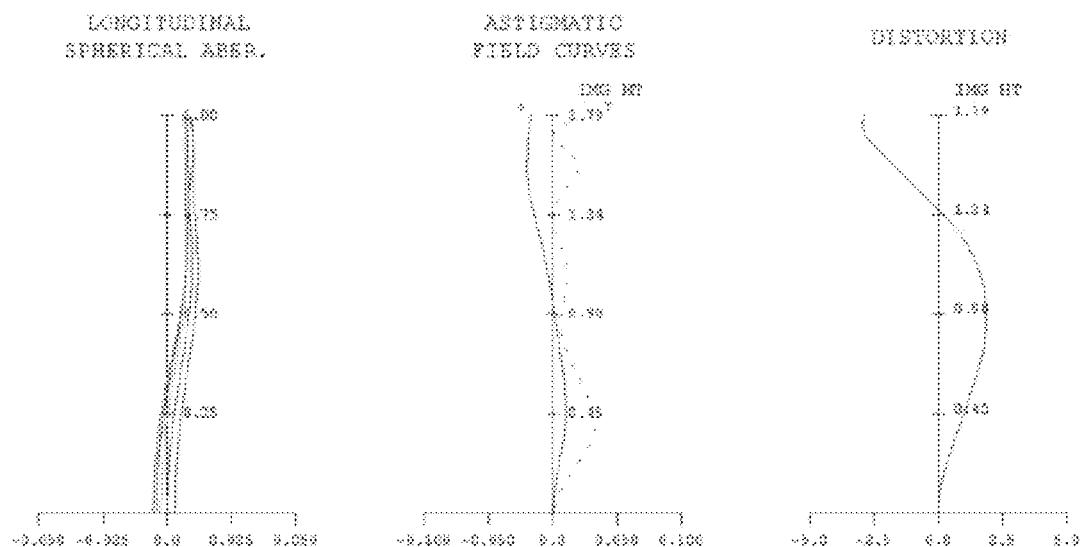
FIG. 3 shows a longitudinal spherical aberration curve, an astigmatic field curve and a distortion curve of the imaging lens assembly shown in FIG. 1.

FIG. 3 shows a longitudinal spherical aberration curve, astigmatic field curve and distortion curve of the imaging lens assembly according to Embodiment 1 shown in FIG. 1. The reference wavelengths corresponding to the longitudinal spherical aberration are 656.28 nm, 587.56 nm, 546.07 nm, 486.13 nm, and 435.83 nm. The reference wavelength corresponding to the astigmatic field curve and the distortion curve is 587.56 nm.

Table 3 shows the detailed optical data of Embodiment 2 shown in FIG. 2 and the aspheric surface data are shown in Table 4 below.

TABLE 3

Embodiment 2
f = 2.085 mm, Fno = 2.2, DOF = 42.7895°

| Surface number | | Curvature radius | thickness | refraction index | Abbe number |
|---|---|---|---|---|---|
| object side | sphere | infinity | infinity | | |
| stop | sphere | infinity | 0.00000 | | |
| 2 | asphere | 1.50434 | 0.47430 | 1.5441 | 56.1000 |
| 3 | asphere | −2.05492 | 0.25015 | | |
| 4 | asphere | −0.72959 | 0.29218 | 1.6355 | 23.9000 |
| 5 | asphere | −1.66787 | 0.02550 | | |
| 6 | asphere | 5.26000 | 0.57769 | 1.5441 | 56.1000 |
| 7 | sphere | −2.02804 | 0.07425 | | |
| 8 | asphere | 0.82389 | 0.30822 | 1.5348 | 56.0000 |
| 9 | asphere | 0.57082 | 0.26716 | | |
| 10 | sphere | infinity | 0.21000 | 1.5167 | 64.2000 |
| 11 | sphere | infinity | 0.45504 | | |
| image plane | sphere | infinity | 0.00496 | | |

TABLE 4

| aspherical coefficient | | | | | | | |
|---|---|---|---|---|---|---|---|
| K | a4 (A) | a6 (B) | a8 (C) | a10 (D) | a12 (E) | a14 (F) | a16 (G) |
| −2.2014E+00 | −1.4327E−01 | −7.2254E−01 | 1.0823E−01 | −6.5564E+00 | 2.9553E+00 | −1.0629E+01 | |
| 7.2276E+00 | −4.6481E−01 | −2.4867E−01 | −5.6957E−03 | 3.1592E+00 | −5.8623E+00 | −4.3206E+00 | |
| −8.1635E−01 | −7.8703E−02 | 1.9941E+00 | 1.9322E−01 | −2.6989E+00 | −2.3531E+00 | 5.6758E+00 | 4.1438E−01 |
| 1.7331E+00 | −7.6507E−04 | 1.5617E+00 | −6.7291E−01 | −9.8247E−01 | 1.0213E+00 | 8.5064E−01 | −1.2471E+00 |
| −3.9242E+01 | 6.6249E−02 | −2.7573E−01 | 3.1737E−01 | −7.1246E−02 | −1.8231E−01 | −8.0438E−02 | 2.5673E−01 |
| −4.6444E+00 | −6.8074E−01 | −1.2554E−01 | 7.6993E−01 | −5.2526E−01 | −5.1830E−02 | 1.2016E−01 | −3.8013E−02 |
| −2.6070E+00 | −6.4615E−01 | 6.1940E−01 | −3.6959E−01 | 8.7233E−02 | 9.9158E−03 | −6.8577E−03 | −3.2433E−04 |

Figure 4:
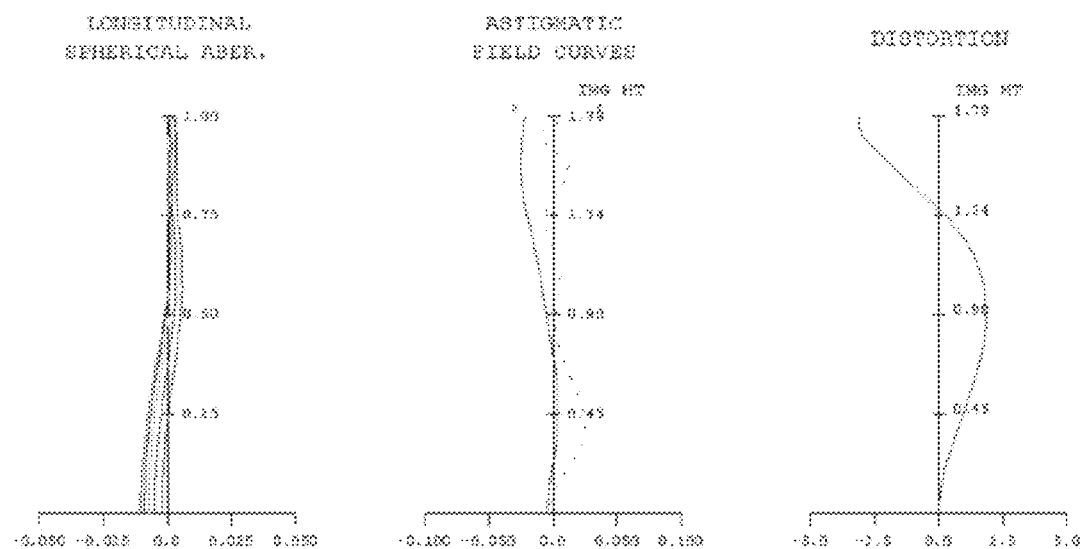
FIG. 4 shows a longitudinal spherical aberration curve, an astigmatic field curve and a distortion curve of the imaging lens assembly shown in FIG. 2.

FIG. 4 shows a longitudinal spherical aberration curve, astigmatic field curve and distortion curve of the imaging lens assembly according to Embodiment 2 shown in FIG. 2. The reference wavelengths corresponding to the longitudinal spherical aberration are 656.28 nm, 587.56 nm, 546.07 nm, 486.13 nm, and 435.83 nm. The reference wavelength corresponding to the astigmatic field curve and the distortion curve is 587.56 nm.

Table 5 shows all parameters of the imaging lens assembly of the embodiments corresponding to conditions (1)~(3).

TABLE 5

| Condition | Embodiment1 | Embodimet2 |
|---|---|---|
| 2.4 < \|R6/R7\| < 2.6 | 2.329 | 2.496 |
| 0.65 < Yc1/y < 0.75 | 0.675 | 0.674 |
| 0.80 < TTL/2y < 0.95 | 0.82 | 0.82 |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An imaging lens assembly, comprising in order from an object side to an image side:
a stop;
a first lens having a positive refractive power, a convex object-side surface and a convex image-side surface;
a second lens having a negative refractive power and a convex and meniscus shaped image-side surface;
a third lens having a positive refractive power, a convex object-side surface and a convex image-side surface;
a fourth lens having a negative refractive power, an image-side surface being concave at a paraxial region and being convex and meniscus shaped at a peripheral region, and an object side-surface being convex at the paraxial region; the image-side surface of the fourth lens having an inflection point;
at least one of the image-side surfaces of three lenses being spherical, and the imaging lens assembly satisfying following condition:

$$2.4 < \frac{R6}{R7} < 2.6$$

wherein:
R6 is a curvature radius of the object-side surface of the third lens;
R7 is a curvature radius of the image-side surface of the third lens.
2. The imaging lens assembly of claim 1 further satisfies the following condition:

$$0.65 < \frac{Yc1}{y} < 0.75$$

wherein:
when the incident angle of the light is 38.5° and the light passes through the center of the stop, the vertical distance from the optical axis to the intersection point of the light and the image-side surface of the fourth lens is Yc1;
a maximum image height of the imaging lens assembly is y.
3. The imaging lens assembly of claim 1 further satisfy the following condition:

$$0.80 < \frac{TTL}{2y} < 0.95$$

wherein:
TTL is an axial distance between the object-side surface of the first lens and the image plane;

y is a maximum image height of the imaging lens assembly.

4. The imaging lens assembly of claim 1, wherein, the object-side surface of the fourth lens has an inflection point, and the object-side surface is convex at a paraxial region and is concave and meniscus shaped at a peripheral region.

5. The imaging lens assembly of claim 1, wherein, an Abbe number of the second lens is less than that of the first lens, third lens or fourth lens, and the difference therebetween is ranged from 20 to 30.

6. The imaging lens assembly of claim 1, wherein, Abbe numbers of the first, third and fourth lenses are ranged from 50 to 60.

7. The imaging lens assembly of claim 1, wherein, the first, second, third and fourth lenses are made of plastic material.

* * * * *